United States Patent [19]

Fix

[11] 3,900,680
[45] Aug. 19, 1975

[54] CORD FOR EXTENSIBLE BELT
[75] Inventor: Sidney R. Fix, Lincoln, Nebr.
[73] Assignee: The Goodyear Tire & Rubber Company, Akron, Ohio
[22] Filed: Nov. 19, 1973
[21] Appl. No.: 417,316

Related U.S. Application Data
[60] Continuation of Ser. No. 232,833, March 8, 1972, abandoned, which is a division of Ser. No. 26,457, March 5, 1970, Pat. No. 3,666,584, which is a division of Ser. No. 739,674, June 25, 1968, Pat. No. 3,566,706.

[52] U.S. Cl. ............... 428/378; 28/75 R; 156/139; 428/395; 264/342 RE
[51] Int. Cl. .............................................. F16g 1/00
[58] Field of Search ........... 161/143, 144, 170, 227, 161/231, 239; 156/89, 161, 139, 169, 229; 28/75 R; 118/33; 264/342 RE; 74/233

[56] References Cited
UNITED STATES PATENTS

| | | | |
|---|---|---|---|
| 2,453,013 | 11/1968 | Illingworth et al. | 28/76 R |
| 2,593,320 | 4/1952 | Lewis et al. | 264/342 RE |
| 2,955,345 | 10/1960 | Howe | 28/72 |
| 2,955,345 | 10/1960 | Howe | 28/75 R |
| 3,424,833 | 1/1969 | Mazzolini et al. | 28/76 R |
| 3,453,817 | 7/1969 | Strub | 28/76 R |
| 3,505,164 | 4/1970 | Oppenlander | 161/173 |

FOREIGN PATENTS OR APPLICATIONS
985,417  3/1965  United Kingdom

Primary Examiner—George F. Lesmes
Assistant Examiner—James J. Bell
Attorney, Agent, or Firm—F. W. Brunner; R. P. Yaist

[57] ABSTRACT

An extensible belt, particularly a power transmission belt, containing a tension section of longitudinally extending individual textile cords which include synthetic thermoplastic filamentary material in their structure. The cords are simultaneously relaxed and heat-treated in the absence of applied tension and are thereby capable of an initial stretch or elongation within certain defined limits and a subsequent recovery of at least a substantial portion of the initial stretch. The cords are subsequently incorporated into the belt and the vulcanized belt is thereby made extensible within certain defined limits and capable of being stretched in order to be installed in a belt drive assembly. After the initial stretch, the belt subsequently retracts or recovers to the driving position with respect to the pulleys and retains sufficient tension to frictionally engage the pulley surfaces and perform its driving function. The self-tensioning belt of this invention eliminates the need for tensioning devices or means to adjust the drive to provide the proper tension required when conventional transmission belts are employed and is particularly useful in applications involving V-type transmission belts which are designed to operate with grooved pulleys or sheaves.

4 Claims, 6 Drawing Figures

NOTE: BELT SAMPLE BROKE AT
16.7% ELONGATION AND
185 LBS. TENSION.

CORD FOR EXTENSIBLE BELT

This is a continuation of application Ser. No. 232,833 filed Mar. 8, 1972, now abandoned, which is a divisional application of Ser. No. 26,457 filed Mar. 5, 1970, now U.S. Pat. No. 3,666,584 which is a divisional application of Ser. No. 739,674 filed June 25, 1968, now U.S. Pat. No. 3,566,706.

BACKGROUND OF THE INVENTION

This invention generally relates to extensible belts, particularly power transmission belts, containing a tension section of synthetic thermoplastic cords which have been specially treated prior to being incorporated into the belts to enable the belts to be used in a unique manner. This invention also relates to the method of making these belts and the preparation of the cords which are contained in the tension section of the belts. Specifically, this invention has particular application to power transmission belts having generally trapezoidal cross-sections which are designed to operate with grooved pulleys or sheaves.

Transmission belts of flexible resilient material such as rubber or textile fabric are normally used in drive belt assemblies to transmit power from a driving pulley to a driven pulley by being operably positioned in tension about and in frictional engagement with the driving surfaces of the pulleys. These belts, like other rubber articles such as conveyor belts and tires, in most instances contain a tension section of textile cords or square-woven fabric to provide the belt with the necessary longitudinal reinforcement, stability, and flexibility. It has been found that cords of synthetic thermoplastic material such as nylon, polyester, and the like which exhibit varying degrees of elasticity are particularly suitable for this purpose. However, it has also been recognized that these synthetic thermoplastic materials also exhibit varying degrees of dimensional instability because of shrink and growth factors which are detrimental to the operation of the rubber article.

These factors are particularly important in regard to the functioning of power transmission belts. For instance, because of the tendency for the belts to stretch or "grow" after being in operation around the pulleys for extended intervals it is necessary, in order to maintain the proper operating tension, to adjust the center distances between the driving pulleys and the driven pulleys to compensate for the stretch of the belt. If the pulleys are fixed so that the center distance cannot be adjusted it is necessary to provide an additional idler or "take-up" pulley which functions to take up the slack resulting from the natural stretch of the belt in order to apply and continually maintain the proper belt tension. The tension of the belt is especially critical when transmission belts of a generally trapezoidal cross-section, commonly referred to as V-belts, are used since these belts are designed to frictionally or wedgingly engage the V-shaped grooves of the pulleys or sheaves in order to perform their driving function.

Either of the above-described belt drive assemblies are costly because of the movable parts and additional equipment they require. In addition, the labor costs incurred in adjusting these belts present serious economic disadvantages. As those familiar with the art well know, it is therefore desirable to provide a belt drive assembly which does not require adjustment nor additional pulleys to maintain driving tension.

The present invention, by utilizing a unique self-tensioning belt, provides such an assembly which performs satisfactorily in many applications. The belt of this invention is formed endless so that its length in its original free position is substantially less than its length in its installed position in the belt drive assembly. It therefore must be stretched significantly in order to be placed in its operating position around the pulleys and thereafter retracts to the driving position with respect to the pulleys but retains sufficient residual tension to perform its driving function. This unique operating function is accomplished by a special and unusual cord treatment which will be hereinafter fully described.

Those skilled in the art are aware that it is vital in the treatment of heat-shrinkable cords of synthetic thermoplastic material to subject them to various conditions of controlled stretch, relaxation and high temperature to increase their dimensional stability. To this end, various fabric treatments have been developed, for example, as described in Meherg et al. U.S. Pat. No. 2,679,088 and Howe U.S. Pat. No. 2,955,345.

Accordingly, it is considered of the utmost importance to prevent any undue stretch or elongation of the reinforcing textile materials which are incorporated into power transmission belts since this will cause slippage of the belt as it travels around the pulleys and results in a serious loss of power. It is also extremely important to prevent significant shrinkage of the reinforcing materials since the ensuing excessive tension may damage the pulley bearings and cause rapid wear of the belt. Consequently, transmission belts such as V-belts are ordinarily made essentially inextensible in dimensions which conform to the operating length of the belt and cannot be stretched significantly in order to be installed around the pulleys.

However, it has been found that a carefully controlled continuous process in which heat-shrinkable elastic or partially elastic cords, which include synthetic thermoplastic material in their structure, are simultaneously heat-set and relaxed in the absence of applied tension after the rubber-to-textile bonding agent has been applied will produce cords having unusual properties. These treated cords are capable of an initial stretch or elongation within certain defined limits and a subsequent recovery of at least a substantial portion of the initial stretch, without undue elongation thereafter. Examples of the synthetic thermoplastic material are polyester, nylon, or combinations thereof. For instance, polyester filaments or cords which are stretched or elongated up to about 15% of their original length will exhibit rapid recovery of a large portion of the initial stretch. Those skilled in the art know that this treatment is an extraordinary departure from established cord treatment procedure as described in the previously mentioned prior art particularly in view of the well established practice of stretching synthetic thermoplastic material subsequent to the application of the bonding agent.

After these specially treated cords are incorporated into a rubber article such as a belt the belt may be elongated beyond its original vulcanized length and will return to a length somewhat greater than its original length but after this initial elongation it will return substantially to this newly attained length upon subsequent elongation. Consequently, a unique article of manufacture is provided which is both highly flexible and dimensionally stable.

When these specially treated cords are incorporated into the tension section of a power transmission belt the belt is made extensible within certain defined limits and after being vulcanized to a predetermined length less than its installed length is therefore capable of being stretched in order to be installed in the drive belt assembly. This may be accomplished by either pulling or rolling the belt over the edge of the pulleys and onto the pulley surfaces. After the initial stretch required for installation, the belt subsequently retracts or recovers to the driving position with respect to the pulleys and retains sufficient tension to frictionally engage the pulley surfaces and perform its driving function. The extensible belts of this invention are capable of being stretched initially up to about 12% of their original free length, whereas under normal conditions, conventional transmission belts may not be stretched much in excess of 1% without being permanently damaged. In addition, because of the built-in flexibility provided by these specially treated cords, the belts of this invention have superior shock absorbing and resisting properties.

OBJECTS OF THE INVENTION

It is a primary object of this invention to provide an extensible belt which is both highly flexible and dimensionally stable.

It is another primary object of the present invention to provide a power transmission belt which is capable of being stretched in order to be placed in its operating position around the pulleys in a belt assembly but thereafter it retracts to its driving position with respect to the pulleys and retains sufficient residual tension to perform its driving function.

It is another important object of this invention to provide a belt drive assembly which does not require adjustment nor additional idler pulleys to apply or maintain driving tension.

It is still another object of this invention to provide a method for making power transmission belts containing a tension section of cords including synthetic thermoplastic material which have been specially treated prior to being incorporated into the belts to enable the belts to be initially stretched around the pulleys but thereafter to retract to the driving position with respect to the pulleys and retain sufficient tension to provide the necessary driving forces.

It is a further object of this invention to provide a method for heat-treating a cord including synthetic thermoplastic filamentary material in its structure whereby the heat-treated cord produced thereby may be initially elongated a substantial amount, less than the breaking point of the cord, but will recover a substantial portion of the initial elongation and thereafter the recovery of the cord will substantially stabilize from any subsequent elongation to which the cord is subjected.

Other objects and advantages of this invention will become apparent hereinafter as the description thereof proceeds, the novel features, arrangements and combinations being clearly pointed out in the specification as well as the claims thereunto appended.

DESCRIPTION OF THE PREFERRED EMBODIMENTS

Figure 1:
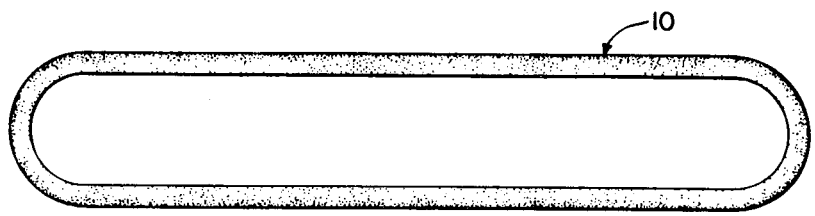
FIG. 1 is a side elevational view of the extensible belt of this invention in its free uninstalled position.

In FIG. 1 the extensible power transmission belt 10 of this invention formed of a basically elastomeric composition is shown, which in this instance, has a generally trapezoidal cross-section and is a side driving type belt referred to as a V-belt. The belt 10 after vulcanization, is normally endless and is illustrated in its original free length prior to being installed in a belt drive assembly.

Figure 2:
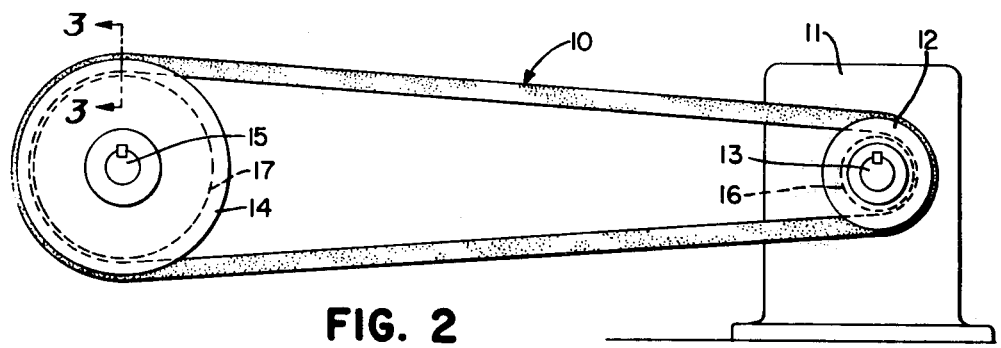
FIG. 2 is a side elevational view of the extensible belt of this invention in its installed position in a belt drive assembly.

FIG. 2 shows a typical belt drive assembly of the type in common use having a motor 11, driving pulley 12 mounted on the shaft 13 which is also connected to the motor 11, and a driven pulley 14 mounted on the shaft 15. The belt 10 is positioned around the pulleys 12 and 14 and seated in the pulley grooves 16 and 17. The length of the belt 10 in this installed position is greater than its original free length as illustrated in FIG. 1, and accordingly it must be stretched a substantial amount in order to be operably positioned around the pulleys 12 and 14. Since it is obvious that any reinforced belt of flexible resilient material may be stretched at least an incremental amount, the terms "stretched a substantial amount" for the purposes of this invention mean more than the amount that any of the essentially inextensible transmission belts may be stretched or more specifically, a stretch of about 1½% or more.

After the belt 10 is stretched initially, it retracts to the driving position with respect to the pulleys 12 and 14 and retains sufficient residual tension to perform its driving function. Therefore, as in the case of other transmission belts when the motor 11 rotates the driving pulley 12 by the rotation of the shaft 13, the sides of the belt 10 maintain the driving tension by frictionally or wedgingly engaging the V-shaped pulley grooves 16 and 17 of the pulleys 12 and 14, and as the belt 10 travels around the pulleys 12 and 14 it tansmits power from the driving pulley 12 to the driven pulley 14.

Figure 3:
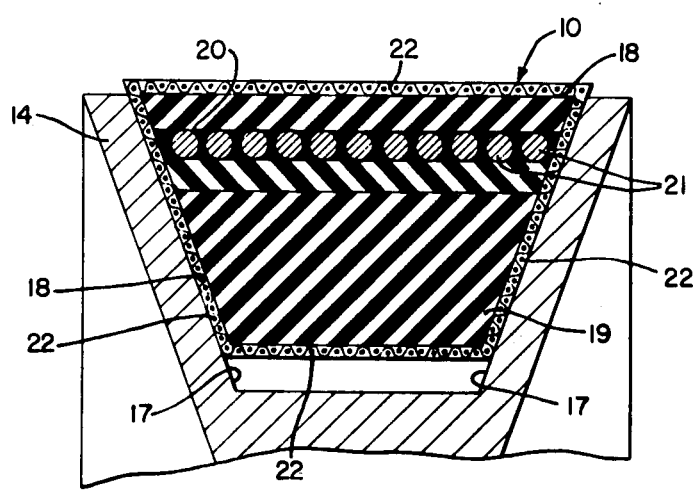
FIG. 3 is an enlarged section taken on line 3—3 of FIG. 2.

This is more clearly illustrated in FIG. 3 which also shows the construction of the belt 10. The belt 10 is a typical V-belt formed in the conventional manner having a body portion 18 of elastomeric material which includes a compression section or cushion 19. A rubber insulated tension section 20 is embedded in the body portion 18 above the compression section 19. The tension section 20 includes a plurality of at least partially elastic cords 21 which are composed at least in part of filaments of synthetic thermoplastic material such as polyester, nylon and the like or possibly combinations thereof. Preferably polyester in the form of cable cords is selected for this purpose because of its high dimensional stability. A rubberized fabric envelope 22 for instance composed of cotton, rayon, nylon or combinations thereof, surrounds the periphery of the belt 10 and frictionally engages the edges of the V-shaped pulley groove 17 of the V-shaped pulley 14 to provide the required driving tension. It is also possible to use a molded or raw edge V-belt for this application which contains a fabric layer on the top of the belt but no envelope wrap.

This unique belt 10 is made extensible by a special and unusual treatment given to the cords 21. The use of the belt 10 in many applications eliminates the necessity of including means for tensioning in the drive assembly which are required when conventional belts are employed in order to apply and maintain the proper driving tension on the belt.

Figure 4:
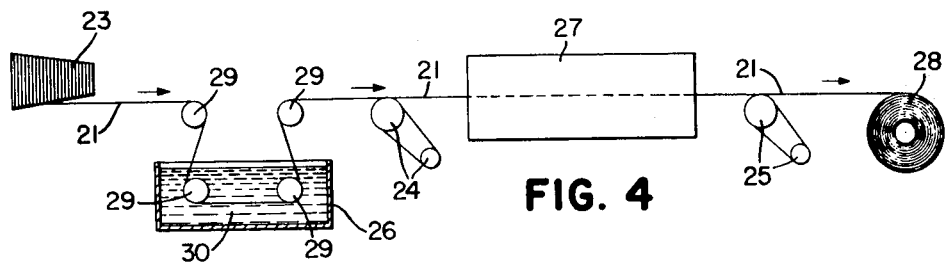
FIG. 4 is a diagrammatic representation of the treatment units employed in treating the cords of this invention.

The preferred procedure for treating the cords 21 which may be referred to as a heat-set relaxation process is shown in FIG. 4. As diagrammatically illustrated, in the manufacture of the cords 21 of this invention, a spool 23 of the synthetic thermoplastic cord 21 in its basic untreated form referred to as griege cord, is first positioned on a cord let-off apparatus (not shown). Individual cord elements 21 are then continuously transmitted through the treatment system under essentially no tension at controlled speeds by means of the drive or tension rolls 24 and 25. Taken in order, the treatment system includes the dipping unit 26, the heating unit 27 and the cord wind-up roll 28 which includes its own drive (not shown).

In the dipping unit 26 the cord 21 travels over guide rolls 29 and is coated and impregnated with a bath 30 of a customary rubber-to-textile bonding agent, for example, an isocyanate dip, used to effect adhesion between the textile cord 21 and the elastomeric body portion 18 of the belt 10. This process takes place at approximately room temperature or for example at about 65°F. to about 85°F. At any one time any specific portion of the cord 21 is in the dipping unit 26 for approximately 2 seconds.

After leaving the dipping unit 26, the cord 21 is fed at a controlled rate into the heating zone of heating unit 27 by means of the tension rolls 24 where it undergoes heat treatment. The cord 21 travels through the heating unit 27 and any one portion of the cord 21 is subjected to temperatures ranging from about 350°F. to about 480°F. for a period of from about 60 to about 180 seconds. Those skilled in the art well know that the specific temperature and time depends largely upon such factors as the size and character of the thermoplastic material being treated and accordingly other ranges may also be appropriate. It has been found, for example, that for Dacron polyester cord having a gauge of from about .015 to about .020 inches, the preferred condition to which the cord is subjected is a temperature of about 410°F. for a period of about 120 seconds.

The above times and temperatures employed during the heat treatment process are naturally less than those required to melt the synthetic thermoplastic cords 21 but do approximate the conditions under which the thermoplastic material will melt in order to soften the cord 21 and facilitate its subsequent processing. One purpose of applying heat to the cords 21, as in conventional treatment processes, is to dry and harden or set the bonding agent present on the surface of the cord 21. More importantly, the heat treatment results in a definite change in the physical properties of the cord 21. An important advantage of the heat treatment procedure of this invention is that the drying and conditioning of the cords is accomplished at the same time instead of requiring an additional or subsequent heating step.

The tension rolls 25 function to pull the cord 21 through the heating unit 27 and cooperate with tension rolls 24 to control the amount of shrinkage the cord 21 undergoes as it is heated. This is accomplished by having the tension rolls 25 geared to operate at a slower speed than the tension rolls 24 so that the cord 21 is pulled out of the heating unit 27 at a slower rate than the cord 21 is fed into the heating unit 27. At the same time, the tension rolls 24 restrict the movement of the cord 21 caused by the shrinkage and thereby, the cord 21 undergoes a controlled relaxation, preferably of about 1 to about 3% of its original untreated length. For example, a Dacron polyester cord having a gauge of from about .015 to about .020 inches undergoes a relaxation of about 2% when the speed of the roll 24 is 2% more than the speed of the roll 25. In this way each individual heat-shrinkable cord 21 is being simultaneously heated and relaxed a controlled amount in the absence of applied tension so that the cord 21 shrinks significantly during such treatment. It has been determined that the attained length of the cord 21 after treatment is from about 1 to about 3% less than its original untreated length. It should be emphasized that no more tension is used during the treatment process other than that which is absolutely necessary in order to transmit the cord 21 through the various stages of the treatment. The cord 21 is therefore heated while in a relaxed state to a temperature approximating the melting point of the individual cord 21 for an interval of time less than that required to melt the cord 21 whereby the cord 21 will shrink to a length less than the original untreated length.

In the final stage of the treatment process the cord 21 is placed on a cord wind-up apparatus such as wind-up roll 28 to await further steps in the belt making procedure.

Figure 5:
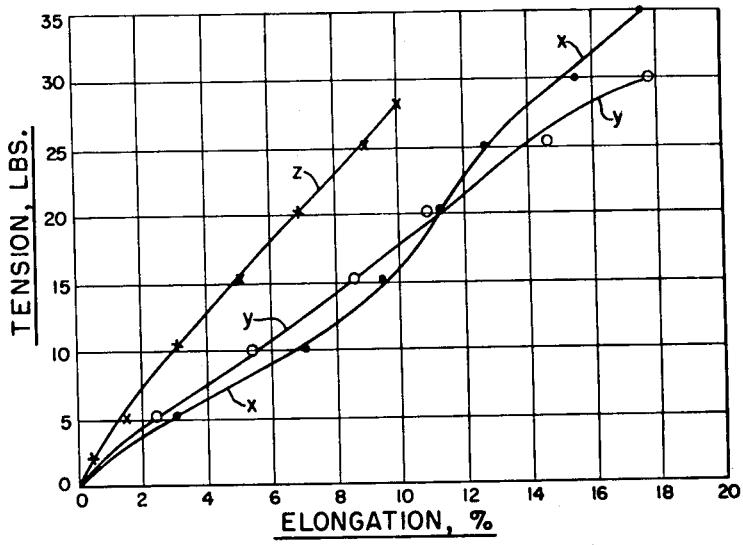
FIG. 5 is a graphic illustration of the comparative elongation characteristics of the cords of this invention when untreated, specially treated, and conventionally treated.

The relative elongation characteristics of the cord 21 after heat-treatment is graphically illustrated in FIG. 5 in which a comparison is made with both the untreated or griege cord and cord of the same type which has been treated in a more conventional manner. The type cord tested was 2200 denier dacron polyester cable cord having a gauge of about .016 to about .017 inches with 1100/2, 10 turns per inch, S twist construction. Average tension and elongation data are plotted in the form of curves $x$, $y$ and $z$. Curve $x$ represents the plot for the untreated cord, curve $y$ represents the plot for the cord treated by the methods of this invention, and curve $z$ represents the plot for a cord which has been stretched 6% during its cord treatment procedure. The data indicates that the cord treated by the methods of the present invention has the greatest elongation at increased tension. For example, the elongation at 25 pounds pull for curve $y$ is 14.6%, as compared to 12.8% for curve $x$ and 9% for curve $z$.

The treated cords 21 are then incorporated into the body portion 18 of the belt 10 to form the tension section 20 by any of the conventional methods well known in the art. For instance by cutting the cords 21 to the desired length, spirally winding the cords 21 over the elastomeric cushion layer 19 which has been previously placed on a building drum, and then placing another layer of elastomeric material over the cords. A rubberized fabric envelope 22 then may or may not be applied depending upon the type of belt being formed. The belts 10 are thereafter vulcanized under heat and pressure according to well established procedures such as by means of a conventional curing mold.

The vulcanized belts of this invention are stretched from about 1½ to about 12% in order to be operably positioned in the drive belt assemblies. However, it should be realized that the higher the per cent initial stretch of the belt the smaller the per cent recovery and therefore the shorter the belt operating life because of the increased possibility of ultimate belt slippage. For most applications the necessary stretch is from about 2 to about 5%. Example 1 indicates typical test data on the performance of the extensible transmission belts of this invention.

EXAMPLE I

Five power transmission belts of the V-type were prepared by the method as previously described and are labeled A through E.

The cords which comprise the tension section of these belts were processed in the manner described using the treatment units shown in FIG. 4. The type of synthetic thermoplastic material selected was 2200 denier dacron polyester cable cord having a gauge of .016 inches with 1100/2, 10 turns per inch, S twist construction. Polyester was chosen for this application because of its relatively high dimensional stability. These cords were coated and impregnated at room temperature with a rubber-to-textile bonding agent or adhesive dip which was composed of from about a 5 to about a 15% solution by volume of isocyanate in toluene. The specific type and composition of the dip will of course depend on the physical characteristics of the textile material being coated. At any one time any portion of the cord was in the dip bath for about 2 seconds.

The cords were subsequently subjected to a temperature of about 410°F. for about 120 seconds to dry and harden the bonding agent and impart shrinkage to the cords while simultaneously undergoing a 2% relaxation process in the absence of applied tension which resulted in the attained length of the cords after treatment being about 2 per cent less than the original length of the raw untreated cords.

The belts A through D were formed by incorporating the specially treated cords into a neoprene rubber formulation and a rubberized cotton fabric envelope was applied around the periphery of this structure to form the unvulcanized belt. This was accomplished by means of a standard building drum. Belt E had the same construction as belts A through D except that it contained no fabric envelope on the sides or bottom of the belt. The belts A through E thus formed were then vulcanized in a conventional manner. The vulcanized belts contained a cushion of neoprene rubber and a tension section of five (5) longitudinally extending dacron polyester cords. Belts A through D after vulcanization had a length of 43 inches, a top width of .422 inches, a bottom width of .256 inches, a thickness of .219 inches and an angle of 42°. Belt E had a length of 44 inches, a top width of .417 inches, a bottom width of .234 inches, a thickness of .281 inches and an angle of 36°.

The power transmission V-type belts A through E were installed in a suitable belt testing unit having a capacity of 1.5 horsepower and belt operating speed of about 1,440 feet per minute.

Belt A was installed and removed by adjusting the center distance between the pulleys of the belt testing unit. Belts B, C, D and E were installed by being rolled onto these pulleys and were removed by being rolled off these pulleys with the distance between the pulleys remaining fixed or constant. All the belts were operated at the particular horsepower setting and for the number of hours specified and then removed from the testing unit. Pertinent comments were made as to the condition of the belts. The results of the tests are recorded in Table A.

TABLE A

| Belt | Horsepower Transmitted | Installation Stretch* (%) |       | Hours | Condition of Belt |
|------|------------------------|---------------------------|-------|-------|-------------------|
| A    | 0.2                    | 2.3                       |       | 74    | Satisfactory      |
|      | 0.42                   | No reset                  |       | 335   | No defects        |
|      |                        |                           | Total | 409   |                   |
| B    | 0.42                   | 2.3                       |       | 292   | Satisfactory      |
|      | 1.0                    | No reset                  |       | 182   | One envelope      |
|      |                        |                           | Total | 474   | crack             |
| C    | 1.0                    | 4.65                      |       | 339   | Satisfactory Slight envelope cracking on side walls of belt |
| D    | 1.22                   | 7.0                       |       | 349   | Satisfactory Some belt slippage noted due to machine failure |
| E    | 0.96                   | 4.65                      |       | 1908  | Satisfactory No defects |

\* The stretch percentage noted at installation is that as the belt is seated in the pulley grooves and does not include the additional stretch required to roll the belt over the edge of the pulleys. The amount of this stretch in inches may be approximated by using the following formulation:
Stretch (inches) = Thickness of belt (inches) × $2\pi$.

The results noted in Table A indicate that the Belts A through D which contained the cotton fabric envelope performed satisfactorily except for the minor defects indicated particularly occurring in the envelope of belts B and C. It is significant that belt E of a molded or raw edge construction containing no fabric envelope on the sides and bottom of the belt performed very satisfactorily when compared to belts A through D. The envelope defects may be attributed to the considerable strain the outer fabric envelope is subjected to during the initial stretching of the belt since the cotton fabric does not expand or extend as readily as either the elastomeric material of the body portion or the specially treated elastic cords contained in the body portion of the belt. The slippage of belt D was primarily due to equipment problems and in no way indicates a deficiency in the performance of the belt.

The horsepower settings for belts A and B were increased without resetting or repositioning the belts in the testing unit. The results for belt B indicate that as little as 2.3% installation stretch will cause sufficient subsequent retraction and tension to transmit up to one horsepower. In addition, since satisfactory results are also obtained with an installation stretch of 7% as indicated by the results for belt D, this approximate 5% additional stretch further indicates that each belt size may fit a range of various size drive belt assemblies.

Figure 6:
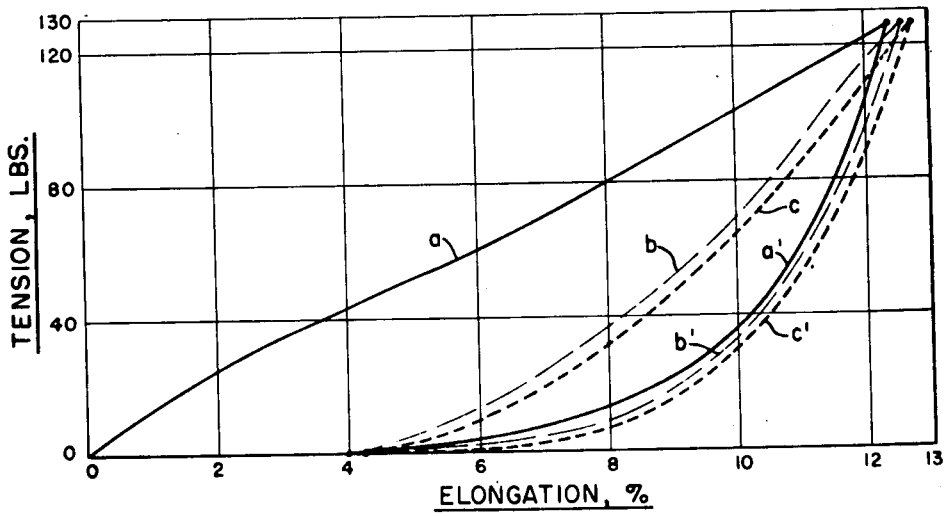
FIG. 6 is a graphic illustration of the typical hysteresis characteristics of the extensible belt of this invention.

The unique elongation properties of the belts are illustrated in the belt hysteresis graph shown in FIG. 6. The belt samples used in obtaining the belt hysteresis data were taken from the same production lot of belts produced at the same time as belts A through D. It was determined that the belt broke at about 16.6% elongation under a tension of 185 pounds as illustrated. Therefore, a smaller tension of 126 pounds pull was applied for the purpose of obtaining the average hysteresis data which resulted in an initial elongation from 0 to 12.4%, represented by curve $a$, and a recovery to 4.0% represented by curve $a'$ or about 70% of the initial elongation. Curves $b$, $b'$, and $c$, $c'$ illustrate that recoveries in excess of 90% are realized from the subsequent elongation of the belt indicating that the belt recovery stabilizes substantially after the first elongation. For example, after the second elongation to 12.6% (curve $b$) the belt recovers to 4.3% (curve $b'$) and after the third elongation to 12.7% (curve $c$) the belt recovers to 4.6% (curve $c'$). It should be pointed out that the initial tension resulting in the initial per cent elongation or stretch is in excess of that which would normally be applied in order to position the belt around the pulleys. It has been found that polyester cords will return from a greater portion of the initial elongation when smaller initial stretches are applied for instance in the range of 10% or lower. Accordingly, it may be expected that an initial recovery of not less than 70% will be realized when the extensible belts of this invention are utilized.

The data substantiates that the belt of this invention contains cords capable of an initial stretch or elongation and a subsequent recovery of a substantial portion of this stretch without undue elongation thereafter. Consequently, the belt is made extensible or stretchable and thereby capable of installation in a belt drive system by being either pulled or rolled over the edge of the pulleys and onto the pulley surface but it will subsequently retract or recover to the driving position with respect to the pulleys and retain sufficient tension to frictionally engage the pulley surfaces and perform its driving function.

While certain representative embodiments and details have been shown for the purpose of illustrating the invention, it will be apparent to those skilled in this art that various changes and modifications may be made therein without departing from the spirit or scope of the invention.

I claim:

1. A heat-treated textile cord of the type for reinforcing power transmission belts and comprised of filaments of snythetic thermoplastic material selected from at least one of the group consisting of nylon and polyester, said cord produced by the method consisting of heat-treating the cord while in a relaxed state for an interval of time of from about 60 seconds to about 180 seconds and at a temperature of from about 350°F to about 480°F and simultaneously relaxing the cord from about 1 to about 3% of its original length.

2. The cord as claimed in claim 1 wherein, prior to said heat treating, a liquid textile-to-rubber bonding agent is applied to the cord, and said agent on said cord is dried simultaneously with said heat treating.

3. The cord as claimed in claim 1 wherein first a textile-to-rubber bonding agent is applied to the cords and then the cords are subjected to a temperature of from about 410°F for a period of about 120 seconds and simultaneously relaxed about 2% of their original untreated length.

4. The cord as claimed in claim 1 wherein the synthetic thermoplastic material is polyester.

* * * * *